Feb. 15, 1938.                C. E. GODLEY                 2,108,286
                           LAMP CONSTRUCTION
                          Filed Dec. 18, 1935

Inventor
Charles E. Godley
By Braselton, Whitcomb & Davies
Attorneys.

Patented Feb. 15, 1938

2,108,286

UNITED STATES PATENT OFFICE 2,108,286

LAMP CONSTRUCTION

Charles E. Godley, Ferndale, Mich., assignor to United Lens Corporation, Detroit, Mich., a corporation of Delaware Application December 18, 1935, Serial No. 54,994

5 Claims. (Cl. 240—41.36)

This invention relates to lighting and light projecting devices and is particularly useful when applied to headlamps for automotive vehicles.

The invention comprehends light projecting apparatus including a plurality of zones formed to control the vertical distribution of the light projected, said zones being connected by transition surfaces formed with a plurality of members of suitable contour for controlling the lateral distribution of the light projected.

One of the objects of the invention resides in a reflecting surface having novel means to control the rays emanating from a light source associated therewith.

The invention includes a novel combination of reflector, source of illumination and a lens, the reflector being of proper contour for controlling the vertical distribution of the light emanating from the source of illumination and the lateral distribution of certain rays reflected by portions of the reflecting surface.

Another object of the invention resides in an improved reflecting structure having a plurality of paraboloidal surfaces connected by means of transition elements, the paraboloidal surfaces being so positioned with respect to the light source so that light rays emanating from each zone are reflected substantially parallel and slightly downwardly, and the transition element directing the light rays striking the same laterally.

The invention also includes as an object a reflector structure of unitary construction including zones to give the proper direction with respect to the horizontal with reflecting surfaces of suitable contour between the zones for directing light rays laterally.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which Figure 1 is a front view of an automobile headlamp incorporating the invention;

I have shown the principles of the invention as applied to an automotive vehicle headlamp, but it is to be understood that I contemplate the use of the invention wherever the same may be found applicable.

Figure 1:
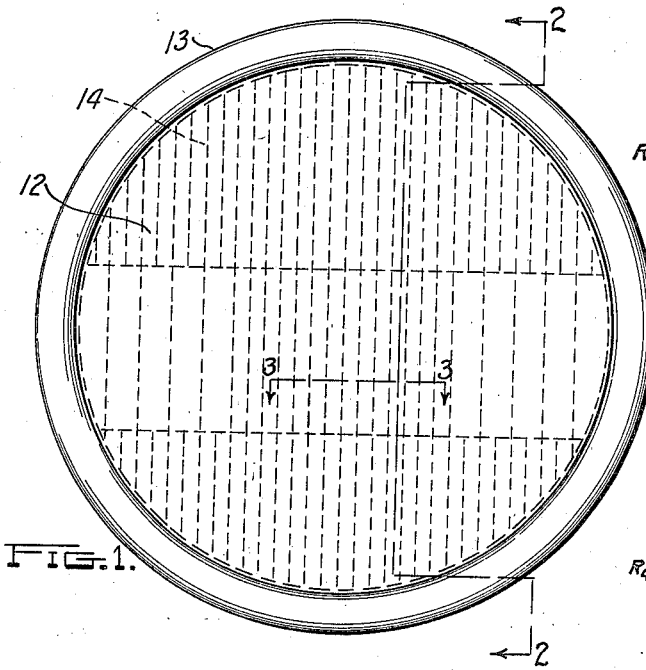
Figure 2:
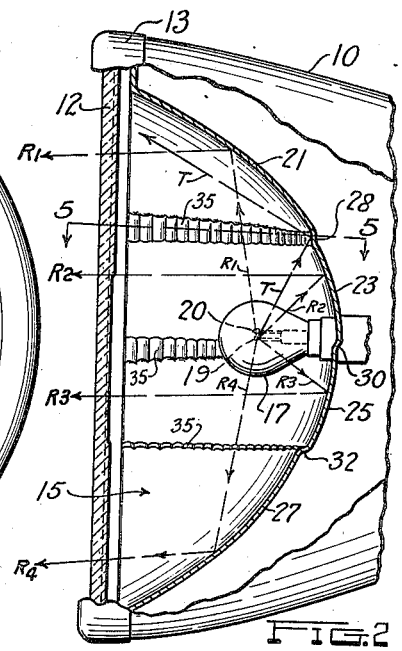
Figure 2 is a cross sectional view of the headlamp taken substantially on line 2—2 of Figure 1 looking in the direction of the arrows.
Figure 4:
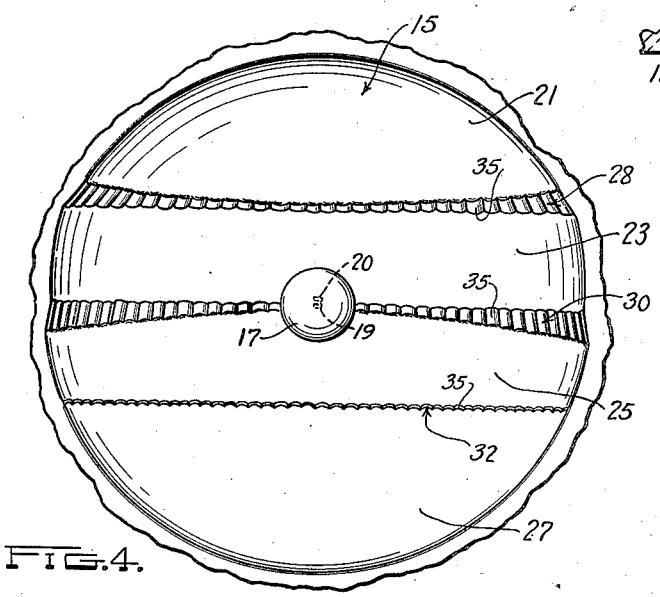
Figure 4 is a front view of the headlamp incorporating the invention with the lens removed.
Figure 3:
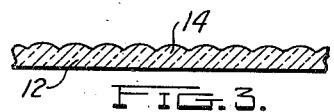
Figure 3 is a fragmentary cross sectional view of the lens taken substantially on line 3—3 of Figure 1 looking in the direction of the arrows.

Referring to the drawing, and particularly to Figures 1 and 2, the invention is shown as incorporated in a headlamp particularly usable with automotive vehicles, capable of projecting light beams, one for country driving and another suitable for city driving or for passing approaching vehicles. The headlamp comprising an outer metallic open ended casing 10 which removably supports a light transparent cover or lens structure 12 closing the front end of said casing by means of a detachable rim member 13 removably secured to the front end of casing 10. The lens 12 is formed on its rear face with a plurality of vertically disposed curved flutes 14 of predetermined curvature and covering sections of the surface of the lens for controlling the lateral distribution of the light beams. Suitably supported within the housing 10 is a reflector 15 with which is associated a lamp bulb 17 having suitable spaced sources of light 19 and 20. The reflector as particularly shown in Figures 2 and 4 comprises a plurality of paraboloidal reflecting surfaces 21, 23, 25, and 27 of different curvatures of revolution, having substantially a common vertex arranged with respect to the location of the light sources or filaments 19 and 20 so as to have their focus or foci within the area occupied by one filament or adjacent thereto in order that light rays emitted from the sources or filaments are reflected slightly downward from the horizontal plane passing through the horizontal axis of the reflector.

The arrangement of the light directing zones 21, 23, 25 and 27 with respect to the light sources 19 and 20 in the form of the embodiment shown for controlling the vertical direction of the light rays is such that the top of the upper beam projected is within the legal limits, compensating for the fact that the light sources or filaments are of appreciable dimensions, eliminating the projection of disagreeable glare. In Figure 2 is diagrammatically shown that light rays such as R1, R2, R3, R4 which are emitted by the lower filament 19 which when energized produces the country driving beam are reflected by the zones slightly downwardly as indicated by the lines R1, R2, R3, R4.

The light controlling zones 21, 23, 25 and 27 are connected to each other by means of transition surfaces 28, 30 and 32. These connecting surfaces eliminate the presence of sharp angles at the intersection of the zones. The inclusion of the transition surfaces 28, 30 and 32 connecting the zones not only facilitates the manufacture of the reflector from a single piece but eliminates the presence of errors of curvature, which normally interfere with the proper reflecting characteristics of the light controlling zones.

In practice I have found that transition surfaces such as 28, 30 and 32 which are interposed between light bending zones such as 21, 23, 25 and 27 in association with filaments of appreciable dimension such as lamp filaments 19 and 20 reflect the light rays emitted from the filament striking the same projecting concentrated light spots or upwardly directed beams of an intensity which is highly objectionable. In Figure 2 I have shown diagrammatically that a light ray such as T emitted from filament 19 which strikes the transition zone 28 is reflected taking an upward direction as indicated by line T.

Figure 5:
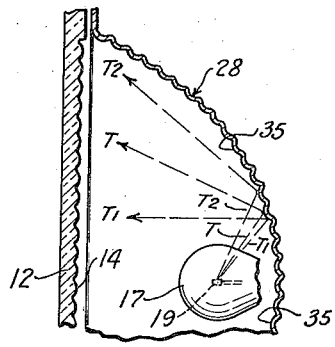
Figure 5 is a fragmentary cross sectional view taken on line 5—5 of Figure 2 looking in the direction of the arrows.

In order to overcome these drawbacks I have found that by forming the transition surfaces with a series of elements of proper contour to project light rays laterally or spread the light projected by these surfaces so that a beam of light of less concentrated intensity is produced covering a broader area thus eliminating these objections. I have also found that in a reflector using a plurality of horizontally disposed reflecting sections to control the vertical distribution of the light rays such as the type shown, that by forming the transition surfaces such as 28, 30 and 32 with a plurality of vertically disposed curved flutes of predetermined contour as 35 the projection of concentrated objectionable light spots are eliminated and that the beam projected is of a suitable intensity covering a broader area. In Figure 5 is diagrammatically illustrated that light rays such as T, T1, T2 which are emitted by filament 19 striking the light directing flutes 35 of transition surface 28 are directed laterally as illustrated by lines T, T1 and T2 indicating the lateral spreading action of the curved elements 35.

The effect of forming the transition surfaces with a plurality of vertically disposed flutes in addition to spread the light directed thereto over a broader area also increases the effective candle power of the beam projected by materially adding to the illumination produced by the sources of light without disagreeable glare.

In the embodiment shown the vertically disposed flutes 35 are convex or projecting forwardly from the surface of the reflector, however I have found that concave vertically disposed flutes serve the purpose very effectively, and that the degree of lateral spread or its control to either side of the vertical axis of the reflector can be obtained by providing curved flutes having the proper directional characteristics such as by offsetting the center of curvature.

The reflector structure shown in combination with the light sources as previously described will give the proper direction to the main beam projected effecting the vertical control and the lateral distribution of light striking the transition surfaces. The lens structure or light refractive medium will control the lateral distribution. It is to be understood that the invention is to be used with any type of headlamp incorporating transition surfaces interposed or adjacent to reflecting elements used to control the direction of the light rays striking the same, and that I do not limit its application to the headlamp construction shown.

It is apparent that, within the scope of the invention, modifications and different arrangements may be made other than is herein disclosed, and the present disclosure is illustrative merely, the invention comprehending all variations thereof.

What I claim is:—

1. In a headlamp, the combination of a concave reflector; a source of light; the reflector including a plurality of horizontally disposed paraboloidal reflecting zones, the zones being so arranged with respect to the location of the light source as to control the vertical distribution of the light beams projected; transition reflecting surfaces interposed between said zones, each of said surfaces formed with a series of interconnected curved members extending transversely along said transition surfaces and arranged to reflect light rays from the source laterally; and a lens having curved flutes to control the lateral distribution of the light reflected from said zones.

2. In a headlamp, the combination of a concave reflector; a lamp bulb having a plurality of sources of light supported by the reflector; the reflector including a plurality of horizontally disposed light reflecting zones of paraboloid configuration having a substantially common vertex, the zones being so arranged with respect to the location of the light sources as to control the vertical distribution of the light beams projected; transition reflecting surfaces interposed between said zones, each of said surfaces formed with a series of vertically disposed convex members of a curvature adapted to reflect light from the sources laterally; and a lens having a surface formed with a plurality of vertically disposed curved elements to control the lateral distribution of the light passing therethrough.

3. In a light projecting apparatus, a plurality of spaced horizontally arranged reflecting zones formed by the revolution of different conical sections, certain of said sections being positioned with respect to a light source so as to direct light rays downwardly; a transition surface interconnecting adjacent zones, said transition surface being formed with a plurality of flutes curved in one direction only, and extending transversely of said surface for the purpose of projecting light rays laterally.

4. In a headlamp, the combination of a reflector; a source of light, said reflector including a plurality of horizontally disposed curved sections adapted to project in a substantially parallel direction light rays striking each of said sections; transition surfaces located between adjoining sections being formed with a plurality of interconnected flutes extending transversely along the transition surfaces, the axis of each of said flutes forming an angle with the axis of the reflector, the source of light being placed with respect to said reflector so that light rays emitted from the source are reflected by the curved sections in a substantially horizontal direction and diffused laterally by said transition surfaces.

5. A one piece reflector containing horizontally positioned paraboloid reflecting surfaces having slightly spaced foci; a transition surface interposed between adjacent paraboloid surfaces, said transition surface formed with a series of interconnected convex flutes extending transversely along said transition surface, and the axis of each of said flutes being angularly arranged with respect to the axis of the reflector.

CHARLES E. GODLEY.